United States Patent
Ichikawa et al.

(10) Patent No.: US 10,946,752 B2
(45) Date of Patent: *Mar. 16, 2021

(54) HYBRID VEHICLE

(71) Applicant: TOYOTA JIDOSHA KABUSHIKI KAISHA, Toyota (JP)

(72) Inventors: Shinji Ichikawa, Toyota (JP); Hiroaki Takeuchi, Toyota (JP); Ryuta Ishida, Okazaki (JP); Hiroaki Arakawa, Nagakute (JP); Shigeki Kinomura, Toyota (JP); Keita Hashimoto, Toyota (JP); Akio Uotani, Toyota (JP); Kazuyuki Kagawa, Toyota (JP); Yusuke Kinoshita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,898

(22) Filed: Jul. 1, 2019

(65) Prior Publication Data
US 2019/0322181 A1    Oct. 24, 2019

Related U.S. Application Data

(63) Continuation of application No. 15/468,263, filed on Mar. 24, 2017, now Pat. No. 10,384,549.

(30) Foreign Application Priority Data

Mar. 30, 2016    (JP) .................... 2016-069253

(51) Int. Cl.
*B60L 58/10*    (2019.01)
*B60L 53/00*    (2019.01)
(Continued)

(52) U.S. Cl.
CPC .............. *B60L 53/00* (2019.02); *B60K 6/28* (2013.01); *B60K 6/46* (2013.01); *B60K 15/03* (2013.01);
(Continued)

(58) Field of Classification Search
CPC .. B60K 15/03; B60K 2006/4825; B60K 6/28; B60K 6/46; B60K 6/48; B60K 6/20;
(Continued)

(56) References Cited

U.S. PATENT DOCUMENTS

| | | | |
|---|---|---|---|
| 5,892,346 A | 4/1999 | Moroto et al. | |
| 6,081,097 A | 6/2000 | Seri et al. | |

(Continued)

FOREIGN PATENT DOCUMENTS

| | | |
|---|---|---|
| JP | 8-19114 | 1/1996 |
| JP | H09-098513 A | 4/1997 |

(Continued)

OTHER PUBLICATIONS

Sarioglu et al., Energy Management for Fuel-Cell Hybrid Vehicles Based on Specific Fuel Consumption Due to Load Shifting, 2012, IEEE, p. (Year: 2012).*

(Continued)

*Primary Examiner* — McDieunel Marc
(74) *Attorney, Agent, or Firm* — Finnegan, Henderson, Farabow, Garrett & Dunner, LLP

(57) ABSTRACT

The number of opportunities where external charging of a vehicle parked in a residential parking space or a charging station in a predetermined period is available is counted as the number of opportunities, and the number of times of the external charging performed in the opportunities in the same predetermined period is counted as the number of times of charging. The number of times of charging is then divided by the number of opportunities to calculate and store a (Continued)

charging frequency. Since the charging frequency is a ratio of the number of times that the external charging was performed to the number of opportunities where the external charging is available in the predetermined period, the ratio is used as an index that can offer more accurate determination regarding an external charging utilization status. As a result, various processing to promote external charging are executed more properly.

6 Claims, 4 Drawing Sheets

(51) Int. Cl.
| | |
|---|---|
| B60L 53/16 | (2019.01) |
| B60W 40/09 | (2012.01) |
| B60L 50/10 | (2019.01) |
| B60L 53/50 | (2019.01) |
| B60K 6/28 | (2007.10) |
| B60K 6/46 | (2007.10) |
| B60K 15/03 | (2006.01) |
| B60L 11/18 | (2006.01) |
| B60K 6/445 | (2007.10) |
| B60K 6/48 | (2007.10) |

(52) U.S. Cl.
CPC .......... *B60L 11/1809* (2013.01); *B60L 50/10* (2019.02); *B60L 53/16* (2019.02); *B60L 53/50* (2019.02); *B60L 58/10* (2019.02); *B60W 40/09* (2013.01); *B60K 6/445* (2013.01); *B60K 6/48* (2013.01); *B60K 2006/4825* (2013.01); *B60W 2530/14* (2013.01); *B60Y 2300/91* (2013.01); *B60Y 2400/112* (2013.01); *Y02T 10/62* (2013.01); *Y10S 903/907* (2013.01)

(58) Field of Classification Search
CPC ............... B60K 6/26; B60K 2370/169; B60K 2370/797; B60K 6/52; B60K 6/24; B60K 6/36; B60K 6/387; B60L 53/00; B60L 53/16; B60L 53/14; B60L 58/12; B60L 58/10; B60L 2250/16; B60L 2220/42; B60L 50/61; B60L 53/50; B60L 2240/54; B60L 2260/52; B60L 53/11; B60L 53/30; B60W 20/00; B60W 20/13; B60W 2510/242; B60W 2510/244; B60W 2530/18; B60W 2530/209; B60W 2530/14; B60W 10/06; B60W 2710/244; B60W 20/20; B60W 2710/24; B60Y 2300/91; B60Y 2400/112; B60Y 2200/92; B60Y 2300/188; Y10S 903/907; Y10S 903/903; Y10S 903/906; Y10S 903/905; H02J 7/0021; H02J 2310/48; H02J 7/0045; H02J 7/007; H02J 7/342; Y02T 10/62; Y02T 10/7072; Y02T 10/70; Y02T 10/72; Y02T 90/12; Y02T 90/14; Y02T 90/16; Y02T 10/40; Y02T 90/167; G01R 31/36

See application file for complete search history.

(56) References Cited

U.S. PATENT DOCUMENTS

| | | | |
|---|---|---|---|
| 6,127,798 A | | 10/2000 | Lansang et al. |
| 8,256,547 B2 | | 9/2012 | Ichikawa |
| 9,111,450 B2 | | 8/2015 | Stefan et al. |
| 9,415,698 B2 | | 8/2016 | Sato et al. |
| 10,328,816 B2 | * | 6/2019 | Ichikawa ............... B60L 58/25 |
| 10,328,854 B2 | * | 6/2019 | Ishida .................. B60L 50/51 |
| 10,328,930 B2 | * | 6/2019 | Abe ..................... B60K 6/543 |
| 10,384,549 B2 | * | 8/2019 | Ichikawa ............... B60L 53/50 |
| 2001/0024104 A1 | | 9/2001 | Suzuki |
| 2002/0003417 A1 | | 1/2002 | Bito et al. |
| 2003/0015358 A1 | | 1/2003 | Abe et al. |
| 2003/0015874 A1 | | 1/2003 | Abe et al. |
| 2003/0025479 A1 | | 2/2003 | Kikuchi |
| 2005/0269991 A1 | | 12/2005 | Mitsui et al. |
| 2007/0073455 A1 | | 3/2007 | Oyobe et al. |
| 2007/0145953 A1 | | 6/2007 | Asai et al. |
| 2008/0205106 A1 | | 8/2008 | Nakamura et al. |
| 2009/0288896 A1 | | 11/2009 | Ichikawa |
| 2011/0022260 A1 | * | 1/2011 | Ichikawa ............... B60K 6/445 701/22 |
| 2013/0151056 A1 | | 6/2013 | Nakano |
| 2014/0008135 A1 | * | 1/2014 | Kinomura ............... B60L 53/65 180/65.1 |
| 2014/0142836 A1 | * | 5/2014 | Yabuta .................. B60W 40/10 701/123 |
| 2017/0259805 A1 | * | 9/2017 | Yamamoto ............... B60K 6/28 |
| 2017/0282726 A1 | * | 10/2017 | Ichikawa ................. B60K 6/28 |
| 2017/0282740 A1 | * | 10/2017 | Ichikawa ............... B60L 53/20 |
| 2017/0282931 A1 | * | 10/2017 | Ichikawa ............... B60L 53/14 |
| 2017/0287234 A1 | * | 10/2017 | Hashimoto ........... B60W 20/00 |

FOREIGN PATENT DOCUMENTS

| | | |
|---|---|---|
| JP | 2000-032606 A | 1/2000 |
| JP | 2001-268719 A | 9/2001 |
| JP | 2001-314039 A | 11/2001 |
| JP | 2003-032803 A | 1/2003 |
| JP | 2003-032807 A | 1/2003 |
| JP | 2003-047108 A | 2/2003 |
| JP | 2004-229354 A | 8/2004 |
| JP | 2009-126456 A | 6/2009 |
| RU | 2048309 C1 | 11/1995 |
| WO | WO02/081255 A1 | 10/2002 |
| WO | WO2007/018223 A1 | 2/2007 |

OTHER PUBLICATIONS

Hague et al., Smart management of PHEV and renewable energy sources for grid peak demand energy supply, 2015, IEEE, p. 2-6 (Year: 2015).*
Bandyopadhyay et al., Aggregator analysis for efficient day-time charging of Plug-in Hybrid Electric Vehicles, 2011, IEEE, p. 1-8 (Year: 2011).*
Krein, Hybrid and Electric Automotive Systems: Combined Electrical, Mechanical, and Fuel Cell Opportunities for Personal Transportation, 2007, IEEE$, p. 1-5 (Year: 2007).*
Geth et al., Impact-analysis of the charging of plug-in hybrid vehicles on the production park in Belgium, 2010, IEEE, p. 425-430 (Year: 2010).
Bose et al., Power and energy storage devices for next generation hybrid electric vehicle, 1996, IEEE, p. 1893-1898 (Year: 1996).
Bandyyopadhyay et al., Aggregator analysis for efficient day-time charging of Plug-in Hybrid Electric Vehicles, 2011, IEEE, p. 1-8 (Year: 2011).
Zhou et al., The charging and discharging power prediction for electric vehicles, 2016, IEEE, p. 4014-4019 (Year: 2016).
U.S. Appl. No. 12/448,519, filed Jun. 24, 2009.
Office Action issued in U.S. Appl. No. 12/448,519 dated Feb. 1, 2012.
Notice of Allowance issued in U.S. Appl. No. 12/448,519 dated May 15, 2012.
Decision on Grant issued in RU2009135039/11 dated Nov. 17, 2010.
U.S. Appl. No. 15/468,263, filed Mar. 24, 2017.

* cited by examiner

HYBRID VEHICLE

INCORPORATION BY REFERENCE

This application is a continuation of U.S. patent application Ser. No. 15/468,263, filed on Mar. 24, 2017, which claims the benefit of Japanese Patent Application No. 2016-069253, filed on Mar. 30, 2016, which are both incorporated herein by reference in their entirety.

BACKGROUND

1. Technical Field

The present disclosure relates to hybrid vehicles, and more particularly relates to a hybrid vehicle configured to charge a battery and supply fuel to a fuel tank.

2. Description of Related Art

Conventionally, as a hybrid vehicle of this type, there has been proposed a vehicle that restricts at least one output out of an output of an electric motor and an output of an internal combustion engine when change in a parameter, which corresponds to fuel consumption consumed by the internal combustion engine from the time of external charging of the battery, reaches a specified value (see, for example, Japanese Patent Application Publication No. 8-19114). In the hybrid vehicle, when change in the parameter reaches the specified value, at least one output out of the output of the electric motor and the output of the internal combustion engine is restricted so as to encourage a driver to conduct external charging and to promote traveling independent of the internal combustion engine. Accordingly, it becomes possible to sufficiently implement an effect of suppressing atmospheric contamination, which is an original purpose of the electric vehicles, while reserving a capacity of the internal combustion engine to allow traveling in emergency situations.

SUMMARY

However, since the aforementioned hybrid vehicle uses the parameter corresponding to fuel consumption consumed by the internal combustion engine from the time of external charging of the battery, it is sometimes difficult to properly determine how much electric travel, which does not involve operation of the internal combustion engine, is being performed or how appropriately the external charging is being conducted.

A hybrid vehicle of the present disclosure provides an index that can offer more appropriate determination regarding a utilization status of external charging.

The hybrid vehicle in a mode of the present disclosure includes an engine, a fuel tank configured to supply fuel to the engine, a motor, a battery configured to be able to supply electric power to the motor, a battery charger configured to be able to perform external charging that charges the battery using an external power supply, and control means, wherein the control means is configured to count the number of opportunities where the external charging of the vehicle is available as the number of charging opportunities and to count the number of times of charging as the number of times that the vehicle performed the external charging in a predetermined period, and the control means is configured to calculate and store a charging frequency as a ratio of the number of times of charging to the number of opportunities. The mode of the present disclosure can also be defined as below. A hybrid vehicle includes: an engine; a fuel tank configured to supply fuel to the engine; a motor; a battery configured to supply electric power to the motor; a battery charger configured to perform external charging that charges the battery using an external power supply; and an electronic control unit configured to i) count the number of times of charging opportunities that the vehicle is in a state where the external charging is available in a predetermined period, as the number of times of opportunities, ii) count the number of times of the external charging that the vehicle performed in the predetermine period as the number of times of charging, and iii) calculate and store a ratio of the number of times of charging to the number of times of opportunities, as a charging frequency.

In the hybrid vehicle in the mode of the present disclosure, the number of opportunities as the number of charging opportunities and the number of times of charging are counted in a predetermined period, and a charging frequency is calculated and stored as a ratio of the number of times of charging to the number of opportunities. It can be determined that as the charging frequency calculated and stored in this way is larger, utilization of external charging is promoted more. Accordingly, the charging frequency can be used as an index that can offer more accurate determination regarding a utilization status of the external charging. Here, "the predetermined period" may be a period predetermined in time, such as in one month or in two months, or may be a period predetermined in terms of opportunities, such as in twenty trips or in thirty trips.

In such a hybrid vehicle in the mode of the present disclosure, the control unit may be configured to count the number of times that the vehicle is parked in a residential parking space and a charging station or in one of the residential parking space and the charging station as the number of opportunities. With the configuration, the charging frequency is the number of times of charging with respect to the number of times that the vehicle is parked in the residential parking space or the charging station in a predetermined period. As a result, it becomes possible to offer more accurate determination regarding the utilization status of the external charging in the residential parking space or the charging station.

In the hybrid vehicle in the mode of the present disclosure, the control unit may be configured to count the number of times that the vehicle is parked in a charging station within a prescribed distance from a residence as the number of opportunities, or may be configured to count the number of times that the vehicle is parked in a charging station registered in advance as the number of opportunities. With the configuration, the charging frequency is the number of times of charging with respect to the number of times that the vehicle is parked in the charging station within a specified distance from the residence in the predetermined period, or is the number of times of charging with respect to the number of times that the vehicle is parked in the charging station registered in advance in the predetermined period. Accordingly, it becomes possible to offer more accurate determination regarding the utilization status of the external charging in the charging station within a specified distance from the residence or the utilization status of the external charging in the charging station registered in advance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Now, a mode for carrying out the present disclosure will be described in detail based on an embodiment.

Figure 1:
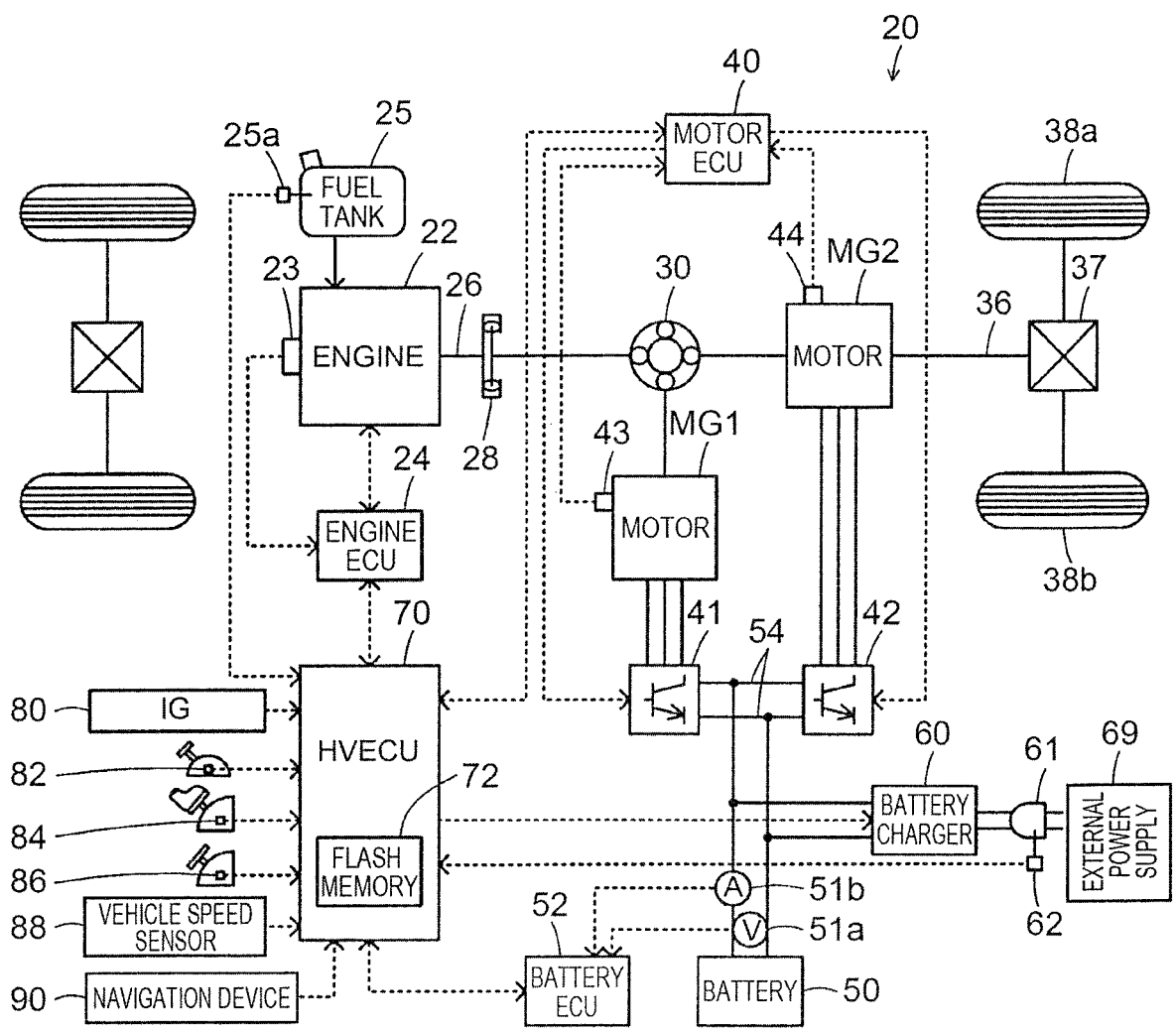
FIG. 1 is a block diagram illustrating an outlined configuration of a hybrid vehicle as an embodiment of the present disclosure.

FIG. 1 is a block diagram illustrating an outlined configuration of a hybrid vehicle 20 as an embodiment of the present disclosure. The hybrid vehicle 20 of the embodiment includes, as illustrated in the drawing, an engine 22, a planetary gear 30, motors MG1, MG2, inverters 41, 42, a battery 50, a battery charger 60, and a hybrid electronic control unit 70 (hereinafter referred to as "HVECU").

The engine 22 is configured as an internal combustion engine that outputs motive power by using fuel such as gasoline and gas oil from a fuel tank 25. The operation of the engine 22 is controlled by an engine electronic control unit 24 (hereinafter referred to as "engine ECU").

Although not illustrated, the engine ECU 24 is configured as a microprocessor having a CPU as a main component. The engine ECU 24 includes, in addition to the CPU, a ROM that stores processing programs, a RAM that temporarily stores data, input and output ports, and a communication port. The engine ECU 24 receives, through the input port, signals from various sensors needed for operation control of the engine 22, the signals including, for example, a crank angle θcr from a crank position sensor 23 that detects a rotational position of a crankshaft 26 of the engine 22. The engine ECU 24 outputs various control signals for operation control of the engine 22 through the output port. The engine ECU 24 is connected with the HVECU 70 through the communication port. The engine ECU 24 calculates a speed Ne of the engine 22 based on the crank angle θcr from the crank position sensor 23.

The planetary gear 30 is configured as a single pinion-type planetary gear mechanism. The planetary gear 30 has a sun gear connected to a rotator of the motor MG1. The planetary gear 30 has a ring gear connected to a driving shaft 36 coupled with wheels 38a, 38b through a differential gear 37. The planetary gear 30 has a carrier connected to the crankshaft 26 of the engine 22 through a damper 28.

The motor MG1, which is configured as a synchronous generator-motor for example, has a rotator connected to the sun gear of the planetary gear 30 as stated before. The motor MG2, which is configured as a synchronous generator-motor for example, has a rotator connected to the driving shaft 36. The inverters 41, 42 are connected with the battery 50 through an electric power line 54. The motors MG1, MG2 are rotationally driven when a motor electronic control unit 40 (hereinafter referred to as "motor ECU") performs switching control of a plurality of unillustrated switching elements of the inverters 41, 42.

Although not illustrated, the motor ECU 40 is configured as a microprocessor having a CPU as a main component. The motor ECU 40 includes, in addition to the CPU, a ROM that stores processing programs, a RAM that temporarily stores data, input and output ports, and a communication port. The motor ECU 40 receives, through the input port, signals from various sensors needed for controlling the operation of the motors MG1, MG2, the signals including, for example, rotational positions θm1, θm2 from rotational position detection sensors 43, 44 that detect rotational positions of the rotators of the motors MG1, MG2. The motor ECU 40 outputs, through the output port, signals such as a switching control signal to a plurality of unillustrated switching elements of the inverters 41, 42. The motor ECU 40 is connected with the HVECU 70 through the communication port. The motor ECU 40 calculates the numbers of rotations Nm1, Nm2 of the motors MG1, MG2 based on the rotational positions θm1, θm2 of the rotators of the motors MG1, MG2 from the rotational position detection sensors 43, 44.

The battery 50 is configured, for example, as a lithium-ion secondary battery or a nickel-hydrogen secondary battery. The battery 50 is connected with the inverters 41, 42 through the electric power line 54 as stated before. The battery 50 is managed by a battery electronic control unit (hereinafter referred to as "battery ECU") 52.

Although not illustrated, the battery ECU 52 is configured as a microprocessor having a CPU as a main component. The battery ECU 52 includes, in addition to the CPU, a ROM that stores processing programs, a RAM that temporarily stores data, input and output ports, and a communication port. The battery ECU 52 receives signals from various sensors needed to manage the battery 50 through the input port. Examples of the signals include a battery voltage Vb from a voltage sensor 51a disposed between terminals of the battery 50, and a battery current Ib from a current sensor 51b attached to an output terminal of the battery 50. The battery ECU 52 is connected with the HVECU 70 through the communication port. The battery ECU 52 calculates a state of charge SOC based on an integrated value of the battery current Ib from the current sensor 51b. The state of charge SOC refers to a ratio of capacity of electric power dischargeable from the battery 50 to the total capacity of the battery 50.

The battery charger 60 is connected to the electric power line 54 and is configured to be able to perform external charging of the battery 50 with electric power from an external power supply 69, such as a household power supply and an industrial power supply, when a power supply plug 61 of the battery charger 60 is connected to the external power supply 69 at a charging point such as a residence and a charging station.

A navigation device 90 includes a main body incorporating a control unit, the control unit having a storage medium such as a hard disk, input and output ports, a communication port and the like, the storage medium storing information such as map information. The navigation device 90 also includes a GPS antenna configured to receive information about a present location of the vehicle, and a touch-sensitive display configured to display a variety of information, such as the information about the present location of the vehicle and a travel route to a destination and to enable an operator to input various instructions. Here, the map information is stored as a database including service information (such as sightseeing information, parking area information, and charging station information) and traffic information on each preset traveling section (such as sections between signaling devices and between junctions). The traffic information includes distance information, width information, area information (urban areas and suburban areas), classification information (general roads and highways), slope information, legal speeds, and the number of signaling devices. As the service information, a residential parking space and desired locations can be registered as registered locations. When a destination is set by the operator, the navigation device 90 searches for a travel route from the present location of the vehicle to the destination based on the map information, the present location of the vehicle and the destination, and outputs the searched travel route on the display to provide route guidance. The navigation device 90 also calculates route information (such as a remaining distance Ln to the destination, and a direction Dn of the destination) for the travel route.

Although not illustrated, the HVECU 70 is configured as a microprocessor having a CPU as a main component. The electronic control unit 70 includes, in addition to the CPU, a ROM that stores processing programs, a RAM that temporarily stores data, a flash memory 72, input and output ports, and a communication port. The HVECU 70 receives signals from various sensors through the input port. Examples of the signals input into the HVECU 70 include an ignition signal from an ignition switch 80, a shift position SP from a shift position sensor 82, an accelerator opening Acc from an accelerator pedal position sensor 84, a brake pedal position BP from a brake pedal position sensor 86, and a vehicle speed V from a vehicle speed sensor 88. The examples of the signals also include a fuel quantity Qf from a fuel gauge 25a attached to the fuel tank 25, a connection signal SWC from a connection switch 62 attached to the power supply plug 61 so as to determine whether or not the power supply plug 61 is connected to the external power supply 69. The HVECU 70 outputs signals such as a control signal to the battery charger 60 through the output port. As described before, the HVECU 70 is connected with the engine ECU 24, the motor ECU 40, and the battery ECU 52 through the communication port. When fuel is supplied to the fuel tank 25, the HVECU 70 calculates a fuel supply quantity Qin based on the fuel quantity Qf from the fuel gauge 25a.

In the thus-configured hybrid vehicle 20 of the embodiment, hybrid traveling (HV traveling) or electric traveling (EV traveling) is performed in a Charge Depleting (CD) mode or a Charge Sustaining (CS) mode. Here, the CD mode is a mode that prioritizes the EV traveling more than the CS mode. The HV traveling is a mode of traveling involving operation of the engine 22. The EV traveling is a mode of traveling without involving operation of the engine 22.

In the embodiment, the HVECU 70 controls the battery charger 60 such that the battery 50 is charged with electric power from the external power supply 69 when the power supply plug 61 is connected to the external power supply 69 while the vehicle is parked in a charging point such as a residence and a charging station with a system of the vehicle being turned off (the system being stopped). If the state of charge SOC of the battery 50 is larger than a threshold Shv1 (that is a value such as 45%, 50%, and 55%) when the system is turned on (the system is started), the vehicle travels in the CD mode until the state of charge SOC of the battery 50 reaches a thresholds Shv2 (that is a value such as 25%, 30%, and 35%) or less. After the state of charge SOC of the battery 50 reaches the threshold Shv2 or less, the vehicle travels in the CS mode until the system is turned off. When the state of charge SOC of the battery 50 is equal to or less the threshold Shv when the system is turned on, the vehicle travels in the CS mode until the system is turned off.

Figure 2:
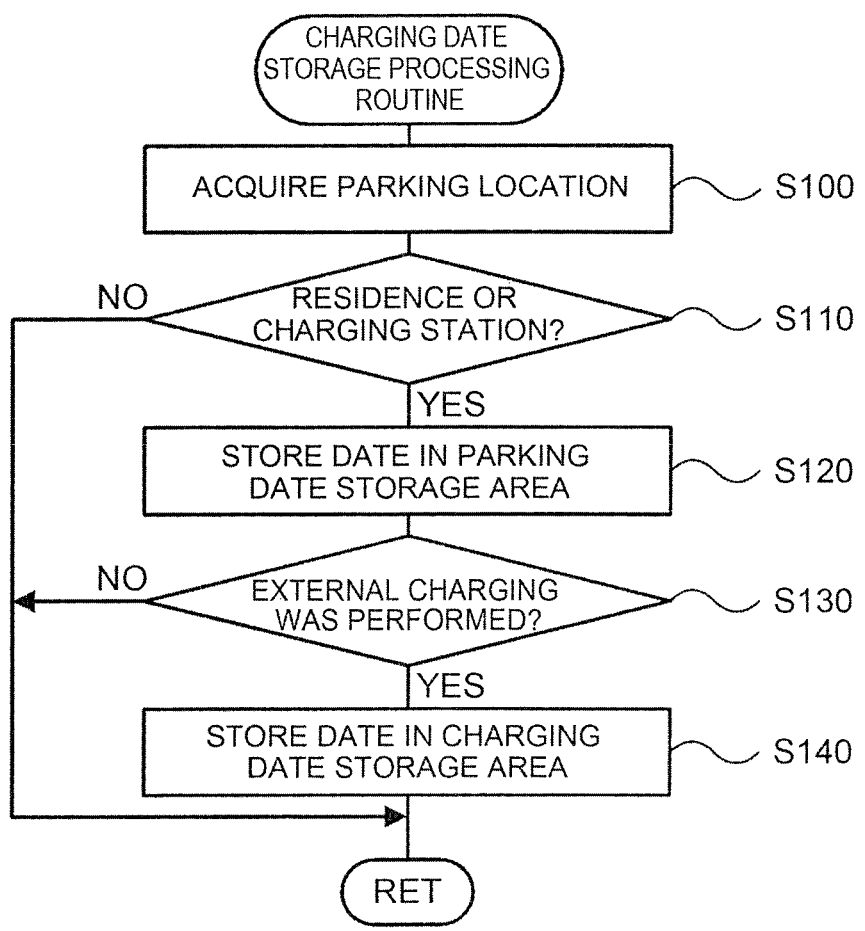
FIG. 2 is a flowchart illustrating one example of a charging date storage processing routine executed by an HVECU.
Figure 3:
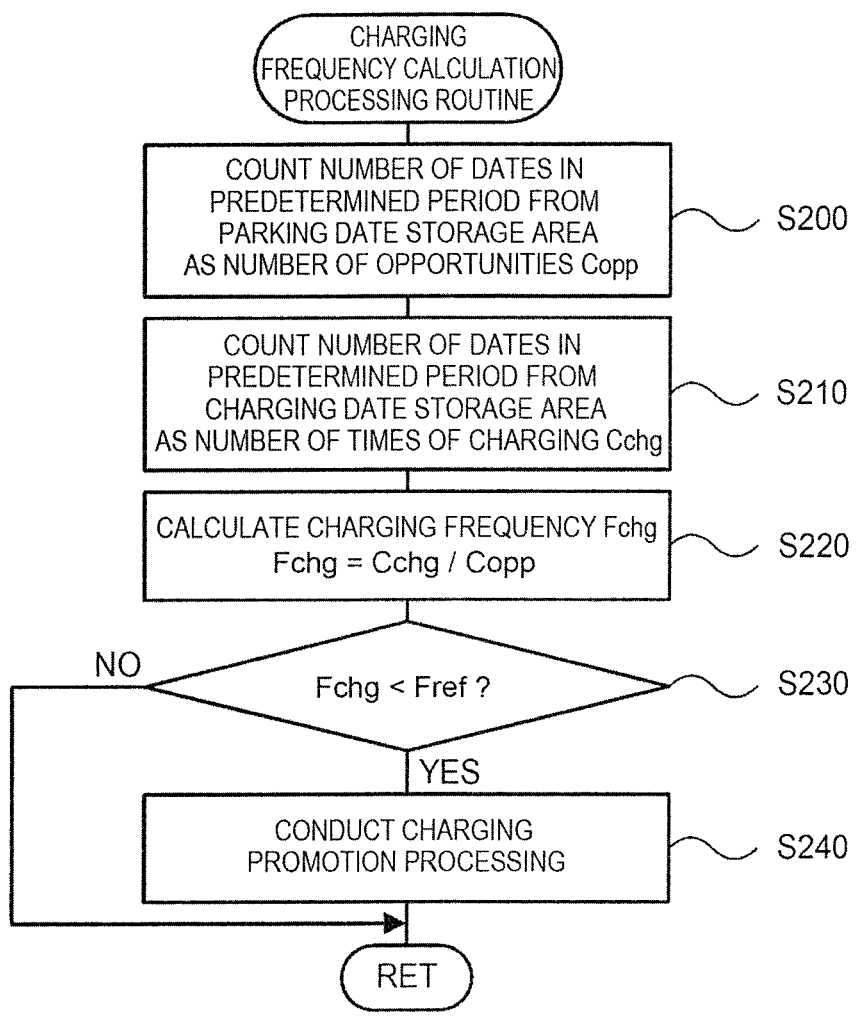
FIG. 3 is a flowchart illustrating one example of a charging frequency calculation processing routine executed by the HVECU.

A description is now given of operation of the thus-configured hybrid vehicle 20 of the embodiment, and particularly the operation of calculating and storing a charging frequency Fchg used as a utilization index of charging (external charging) of the battery 50 by the battery charger 60. FIG. 2 is a flowchart illustrating one example of a charging date storage processing routine executed by the HVECU 70. FIG. 3 is a flowchart illustrating one example of a charging frequency calculation processing routine executed by the HVECU 70. In the embodiment, the charging date storage processing routine and the charging frequency calculation processing routine are executed when the vehicle is parked and the system is turned off (system is stopped), and then the system is turned on (system is started). A detailed description will be provided in sequence.

When the charging date storage processing routine is executed, the HVECU 70 first acquires a parking position from the navigation device 90 (step S100) and determines whether the acquired parking location is a residential parking space or a charging station (step S110). When the parking location is not the residential parking space nor the charging station, it is determined that the vehicle is parked at a location where external charging is not available, and the present routine is ended. When the parking location is the residential parking space or the charging station, it is determined that the vehicle is parked in the location where external charging is available, and a present date is stored in a parking date storage area predetermined in the flash memory 72 (step S120). Then, it is determined whether or not external charging was performed (step S130). Whether or not the external charging was performed can be determined based on a connection signal SWC from the connection switch 62 indicative of connection between the power supply plug 61 of the battery charger 60 and the external power supply 69 and based on whether or not the state of charge SOC of the battery 50 was increased from the SOC at the time when the system was turned off. When external charging was performed, the pertinent date is stored in the charging date storage area predetermined in the flash memory 72 (step S140), and the present routine is ended. When the external charging was not performed, the present routine is ended without the date being stored.

When the charging frequency calculation processing routine is executed, the HVECU 70 first searches for dates within a predetermined period (for example, a period of past 30 days, and a period of past 30 trips) from the parking date storage area of the flash memory 72, and counts the number of the dates as the number of opportunities Copp (step S200). Next, the HVECU 70 searches for dates within the same period (predetermined period) from the charging date storage area of the flash memory 72, and counts the number of dates as the number of times of charging Cchg (step S210). The HVECU 70 then divides the number of times of charging Cchg by the number of opportunities Copp to calculate a charging frequency Fchg, and stores the charging frequency Fchg in a prescribed area of the flash memory 72 (step S220). Since the charging frequency Fchg is a ratio of the number of times of external charging performed to the number of opportunities where the external charging is available in the predetermined period, it can be determined that as the ratio is larger, utilization of the external charging is promoted more. Accordingly, the ratio can be used as an index that can offer more accurate determination regarding the utilization status of the external charging. Once the charging frequency Fchg is calculated and stored in this way, the charging frequency Fchg is compared with a threshold Fref (step S230). When the charging frequency Fchg is equal to or larger than the threshold Fref, it is determined that the utilization status of the external charging is sufficient and the present routine is ended. When the charging frequency Fchg is less than the threshold Fref, it is determined that the utilization status of the external charging is not sufficient. Accordingly, some processing is conducted to promote the external charging, such as notification processing to perform processing such as announcement of a message "Use an external power supply to charge the vehicle", and function restriction processing to perform processing such as restricting the torque necessary for traveling (step S240), and the present routine is ended.

In the hybrid vehicle 20 in the embodiment described in the foregoing, the number of opportunities Copp and the number of times of charging Cchg are obtained, the number of opportunities Copp being counted as the number of opportunities where external charging of a vehicle parked in a residential parking space or a charging station is available in a predetermined period, the number of times of charging Cchg being counted as the number of times of the external charging performed in the opportunities where the external charging is available in the same predetermined period. The number of times of charging Cchg is then divided by the number of opportunities Copp to calculate and store the charging frequency Fchg. Since the charging frequency Fchg is a ratio of the number of times that the external charging was performed to the number of opportunities where the external charging is available in the predetermined period, the ratio is used as an index that can offer more accurate determination regarding the utilization status of the external charging. As a result, various processing to promote external charging can be executed more properly.

In the hybrid vehicle 20 of the embodiment, the residential parking space and the charging station are used as a parking location where the number of opportunities Copp is counted. However, a location to count the number of opportunities Copp may be a charging station within a specified distance (such as 3 km or 5 km) from the residential parking space and the residence, or may be a charging station registered in advance as a regular charging location.

The hybrid vehicle 20 of the embodiment includes the battery charger 60 that charges the battery 50 with the power supply plug 61 being connected to the external power supply 69. However, the hybrid vehicle 20 may include a battery charger that charges the battery 50 by receiving electric power from the external power supply 69 in a non-contact manner.

Figure 4:
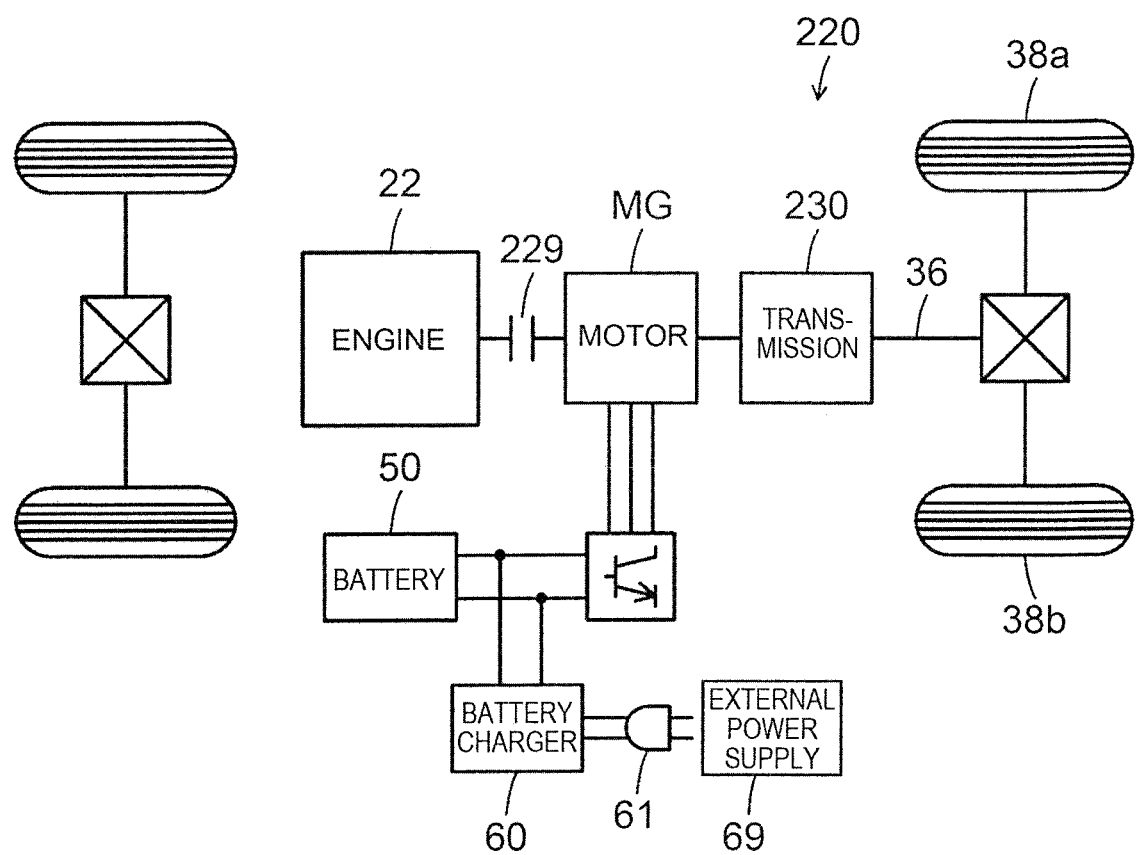
FIG. 4 is a block diagram illustrating an outlined configuration of a hybrid vehicle in a modification.

The hybrid vehicle 20 of the embodiment is configured such that the engine 22, the motor MG1, and the driving shaft 36 are connected to the planetary gear 30, and the driving shaft 36 is connected to the motor MG2. Like a hybrid vehicle 220 in a modification illustrated in FIG. 4, the present disclosure may be configured such that a driving shaft 36 coupled with wheels 38a, 38b is connected to a motor MG through a transmission 230, and a rotating shaft of the motor MG is connected to an engine 22 through a clutch 229. In this case, motive power from the engine 22 may be output to the driving shaft 36 through the rotating shaft of the motor MG and the transmission 230, and motive power from the motor MG may be output to the driving shaft through the transmission 230. The present disclosure may also be configured as so-called a series-hybrid vehicle. That is, the present disclosure may be a hybrid vehicle of any configuration as long as the hybrid vehicle includes an engine, a motor, a battery, and a battery charger connected to an external power supply to charge the battery.

Correspondence relation between the main elements of the embodiment and the main elements of the present disclosure described in Summary will be described. In the embodiment, the engine 22 corresponds to "the engine", the fuel tank 25 corresponds to "the fuel tank", the motor MG2 corresponds to "the motor", the battery 50 corresponds to "the battery", the battery charger 60 corresponds to "the battery charger", and the HVECU 70 that executes the charging date storage processing routine in FIG. 2 and the charging frequency calculation processing routine in FIG. 3 corresponds to "the control unit".

Since the embodiment is one example for specific description of the mode for carrying out the present disclosure described in Summary, the correspondence relation between the main elements of the embodiment and the main elements of the present disclosure described in Summary is not intended to limit the elements of the disclosure described in Summary. More specifically, the disclosure disclosed in Summary should be interpreted based on the description therein, and the embodiment is merely a specific example of the disclosure disclosed in Summary.

Although the mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in the fields such as manufacturing of the hybrid vehicle.

What is claimed is:

1. A hybrid vehicle, comprising:
an engine;
a fuel tank configured to supply fuel to the engine;
a motor;
a battery configured to supply electric power to the motor;
a battery charger configured to perform external charging that charges the battery using an external power supply; and
an electronic control unit configured to
count the number of times of charging opportunities that the vehicle is in a state where the external charging is available in a predetermined period, as the number of times of opportunities,
count the number of times of the external charging that the vehicle performed in the predetermined period, as the number of times of charging, and
calculate and store a ratio of the number of times of charging to the number of times of opportunities, as a frequency of external charging.

2. The hybrid vehicle according to claim 1, wherein the electronic control unit is configured to count at least one of the number of times that the vehicle is parked in a residential parking space and the number of times that the vehicle is parked in a charging station as the number of times of opportunities.

3. The hybrid vehicle according to claim 1, wherein the electronic control unit is configured to count the number of times that the vehicle is parked in a charging station within a prescribed distance from a residence, as the number of times of opportunities.

4. The hybrid vehicle according to claim 1, wherein the electronic control unit is configured to count the number of times that the vehicle is parked in a charging station registered in advance, as the number of times of opportunities.

5. The hybrid vehicle according to claim 1, wherein
the electronic control unit is configured to conduct external charging promotion process based on the frequency of external charging.

6. A method of operating a hybrid vehicle, wherein the hybrid vehicle comprises an engine, a fuel tank configured to supply fuel to the engine, a motor, a battery configured to supply electric power to the motor, a battery charger configured to perform external charging that charges the battery using an external power supply, and an electronic control unit, the method comprising:
- counting the number of times of charging opportunities that the vehicle is in a state where the external charging is available in a predetermined period, as the number of times of opportunities;
- counting the number of times of the external charging that the vehicle performed in the predetermined period, as the number of times of charging; and
- calculating and storing a ratio of the number of times of charging to the number of times of opportunities, as a frequency of external charging.

* * * * *